US011155225B2

(12) United States Patent
Williams (10) Patent No.: US 11,155,225 B2
(45) Date of Patent: Oct. 26, 2021

(54) VEHICLE BUMPER CLEANING DEVICE AND METHODS OF MAKING AND USING THE SAME

(71) Applicant: Toyota Motor Engineering & Manufacturing, North America, Inc., Plano, TX (US)

(72) Inventor: Paxton S. Williams, Milan, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 56 days.

(21) Appl. No.: 16/786,300

(22) Filed: Feb. 10, 2020

(65) Prior Publication Data

US 2021/0245689 A1    Aug. 12, 2021

(51) Int. Cl.
*B60J 7/00* (2006.01)
*B60R 19/48* (2006.01)
*B60S 1/66* (2006.01)

(52) U.S. Cl.
CPC ............... *B60R 19/48* (2013.01); *B60S 1/66* (2013.01)

(58) Field of Classification Search
CPC ......... B60R 19/48; B60R 19/023; B60R 9/10; B60R 9/06; B29C 66/71; Y10S 224/924; A47L 2201/04; A47L 11/24
See application file for complete search history.

(56) References Cited

U.S. PATENT DOCUMENTS

| | | | | |
|---|---|---|---|---|
| 3,117,727 A | * | 1/1964 | Pollock | B60S 1/528 239/284.2 |
| 3,656,691 A | * | 4/1972 | Norstrand | B60S 1/60 239/284.2 |
| 4,230,276 A | * | 10/1980 | Tinder | B60S 1/522 134/179 |
| 5,269,464 A | * | 12/1993 | Epple | B60S 1/528 239/130 |
| 6,021,843 A | | 2/2000 | Roach | |
| 6,186,156 B1 | * | 2/2001 | Schlein | B60S 1/528 134/105 |
| 6,234,410 B1 | * | 5/2001 | Martin | B60S 1/528 239/284.1 |
| 6,296,198 B1 | * | 10/2001 | Tores | B60S 1/481 239/284.1 |
| 6,739,521 B2 | * | 5/2004 | Bandemer | B60S 1/481 15/250.002 |
| 6,854,666 B2 | * | 2/2005 | Jenkins | B60S 1/603 239/284.2 |

(Continued)

*Primary Examiner* — Kiran B Patel
(74) *Attorney, Agent, or Firm* — Christopher G. Darrow; Darrow Mustafa PC (57) ABSTRACT

A vehicle bumper cleaning device includes a selectively longitudinally movable, laterally-extending, bumper sweeper comprising a first end and an opposed second end and configured for disposition proximate an upper surface of a vehicle bumper. The vehicle bumper cleaning device also includes a selectively movable first actuator attached proximate the first end of the bumper sweeper. The vehicle bumper cleaning device also includes a selectively movable second actuator attached proximate the second end of the bumper sweeper, the selectively movable first actuator and the selectively movable second actuator configured to selectively and reversibly move the bumper sweeper rearward and forward across the vehicle bumper.

10 Claims, 7 Drawing Sheets

(56) References Cited

U.S. PATENT DOCUMENTS

| | | | |
|---|---|---|---|
| 6,905,078 B1 * | 6/2005 | Gattuso | B05B 3/0413 |
| | | | 239/11 |
| 7,036,749 B1 * | 5/2006 | Steerman | B05B 1/08 |
| | | | 239/130 |
| 7,434,748 B2 * | 10/2008 | Takada | B60S 1/52 |
| | | | 15/250.002 |
| 7,806,351 B1 * | 10/2010 | Bakas | B05B 15/68 |
| | | | 239/754 |
| 9,096,983 B1 | 8/2015 | Mejia | |
| 9,156,066 B2 * | 10/2015 | Jonas | B60S 1/56 |
| 9,375,737 B1 | 6/2016 | Zucker | |
| 9,487,170 B2 * | 11/2016 | Evans | B29C 51/10 |
| 10,106,201 B2 | 10/2018 | Kowalk | |
| 10,449,920 B2 | 10/2019 | Shen et al. | |
| D909,945 S * | 2/2021 | Langhals | D12/203 |
| 2008/0296279 A1 | 12/2008 | Forrest et al. | |
| 2009/0014555 A1 | 1/2009 | Litvinov et al. | |
| 2009/0218833 A1 * | 9/2009 | Rosemeyer | B60R 19/52 |
| | | | 293/115 |
| 2014/0008460 A1 | 1/2014 | Massaro et al. | |
| 2015/0307046 A1 * | 10/2015 | Fritsch | B60R 13/105 |
| | | | 293/144 |
| 2017/0120830 A1 * | 5/2017 | Baeza | B60R 19/48 |
| 2018/0127616 A1 | 5/2018 | Tuteja et al. | |
| 2018/0162305 A1 | 6/2018 | Shen et al. | |
| 2019/0126872 A1 * | 5/2019 | Hatch | B66D 1/00 |
| 2020/0023796 A1 * | 1/2020 | Barron | B60R 19/12 |
| 2020/0130609 A1 * | 4/2020 | Ibitoye | H04W 4/40 |
| 2020/0398775 A1 * | 12/2020 | Pulleyblank | B60D 1/565 |

\* cited by examiner

FIG. 7

VEHICLE BUMPER CLEANING DEVICE AND METHODS OF MAKING AND USING THE SAME

FIELD OF THE INVENTION

The embodiments disclosed herein relate generally to a vehicle bumper cleaning device and methods of making and using the same, and more particularly to a vehicle bumper cleaning device comprising a bumper sweeper, a first actuator, and a second actuator and methods of making and using the same.

BACKGROUND

The presence of undesirable accumulated materials on vehicle bumpers of automotive vehicles, particularly rear vehicle bumpers, is a long-recognized problem that has had virtually no useful solutions, particularly solutions that are incorporated into the vehicle systems. Therefore, it would be highly desirable to provide a vehicle bumper cleaning device and methods of making and using the same, including a vehicle bumper cleaning device for a rear vehicle bumper.

SUMMARY OF THE INVENTION

In one embodiment, a vehicle bumper cleaning device is disclosed. The vehicle bumper cleaning device comprises a selectively longitudinally movable, laterally-extending, bumper sweeper comprising a first end and an opposed second end and configured for disposition proximate an upper surface of a vehicle bumper; a selectively movable first actuator attached proximate the first end of the bumper sweeper; and a selectively movable second actuator attached proximate the second end of the bumper sweeper, the selectively movable first actuator and the selectively movable second actuator configured to selectively and reversibly move the bumper sweeper rearward and forward across the vehicle bumper.

In another embodiment, a method of making vehicle bumper cleaning device is disclosed. The method includes: providing a selectively longitudinally movable, laterally-extending, bumper sweeper comprising a first end and an opposed second end and configured for disposition proximate an upper surface of a vehicle bumper; attaching a selectively movable first actuator proximate the first end of the bumper sweeper; and attaching a selectively movable second actuator proximate the second end of the bumper sweeper, the selectively movable first actuator and the selectively movable second actuator configured to selectively and reversibly move the bumper sweeper rearward and forward across the vehicle bumper.

In another embodiment, a method of using vehicle bumper cleaning device is disclosed. The method of using comprises: installing a vehicle bumper cleaning device into a vehicle comprising a rear bed, a selectively openable/closable tailgate pivotably attached to the rear bed, and a rear bumper disposed under and rearward of the tailgate, the vehicle bumper cleaning device comprising a selectively longitudinally movable, laterally-extending, bumper sweeper comprising a first end and an opposed second end and configured for disposition proximate an upper surface of the vehicle bumper; a selectively movable first actuator attached proximate the first end of the bumper sweeper; and a selectively movable second actuator attached proximate the second end of the bumper sweeper, the selectively movable first actuator and the selectively movable second actuator configured to selectively and reversibly move the bumper sweeper rearward and forward across the vehicle bumper; opening the selectively openable/closable tailgate, wherein the selectively movable first actuator and selectively movable second actuator actuate to move the bumper sweeper rearward across the vehicle bumper; and closing the selectively openable/closable tailgate, wherein the selectively movable first actuator and selectively movable second actuator actuate to move the bumper sweeper forward across the vehicle bumper.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The invention comprises a vehicle bumper cleaning device and methods of making and using the same, and more particularly a vehicle bumper cleaning device comprising a bumper sweeper, a first actuator, and a second actuator and methods of making and using the same. The invention is provided for vehicles that include vehicle beds and selectively openable/closable tailgates, such as pickup trucks and various car models. These vehicles are very popular for a variety of reasons, including their flexible load carrying capabilities and their ability to be used in many applications and on widely varying road types and conditions from highways to city streets as well as in a wide variety of off-road locations. The invention may be used with manual and automatic tailgates. Manual tailgate operation includes unlocking the tailgate from a closed and locked condition in an upright or vertical closed position followed by manually lowering the tailgate about pivotable hinges to a horizontal or open position and an open and unlocked condition where the horizontal or open position of the tailgate is maintained by metal cables attached to each end of the tailgate that are attached to the tailgate end on one cable end and the vehicle bed on an opposite cable end. With the increased automation in and autonomous control of automotive vehicles and their vehicle gates of various types, such as liftgates, tailgate operation has also been automated by the incorporation of various mechanisms that include various forms and combinations of electric motors and solenoids to lock and unlock the tailgates, as well as to automate the opening and closing of the tailgates.

For both manual and automated tailgates, one drawback to their use continues to be the potential for accumulation of material on the rear bumper to an extent (e.g., height) that the accumulated material can interfere with the operation of the tailgate and/or cause damage to the rearward facing surface of the tailgate when it is opened to the open/horizontal position. Accumulated material includes any undesirable foreign material, including snow, slush, ice, dirt, sand, mud, gravel, stones, wood, mulch, ash, or a combination thereof, that accumulates on the vehicle bumper in any manner, including naturally from rain, sleet, or snowfall, or by being thrown up by the tires from a road surface, or from the unloading of the material from the bed. For example, during heavy snowfall, slush, snow, and/or ice accumulation may occur, as well as the accumulation of dirt, sand, mud, gravel, and/or stones during off-road use. If the tailgate is opened without removing the accumulated material, it is possible for the rearward facing surface of the tailgate to contact this material, which can cause damage (i.e. scratches, dents, holes, etc.) to the rearward facing surface of the tailgate, as well as damage to the tailgate hinges and/or tailgate opening mechanism.

Prior solutions to this problem have included manual removal of the accumulated material by a vehicle operator, which is generally time consuming and messy and can be inadvertently overlooked. In addition, when the tailgate is opened by an automatic opener, the motor may be equipped to sense interference from the accumulated materials and stop the tailgate from opening or even to reverse the direction of travel. However, it is still possible to damage the tailgate, including the tailgate sheet metal, plastic overlays or facia, or paint disposed on the rearward facing surface, by contact with the accumulated materials before these actions are taken.

As used herein, the terms front or forward or rear or rearward or aft refer to the front or rear of the article or vehicle, or to a direction toward the front or rear of the article or vehicle, respectively. The term longitudinal or along the length refers to a direction that extends along or generally parallel to an article or vehicle centerline between the front and the rear, or from one end to an opposed end. The term lateral or along the width or left-right refers to a direction that is orthogonal, or substantially orthogonal, to the longitudinal direction. The terms up or upward or down or downward refer to the top or bottom of the article or vehicle, or to a direction substantially toward the top or bottom of the article or vehicle, respectively. The terms in or inner or inward refer to a direction toward the center of the article or vehicle, and out or outer or outward refers to the opposite direction away from the center or central portion of the article or vehicle. The terms pivotable or pivotably refer to rotational movement of an article on a pivot or about a pivot point or pivot axis and can be substituted with the terms rotatable or rotatably.

Figure 1:
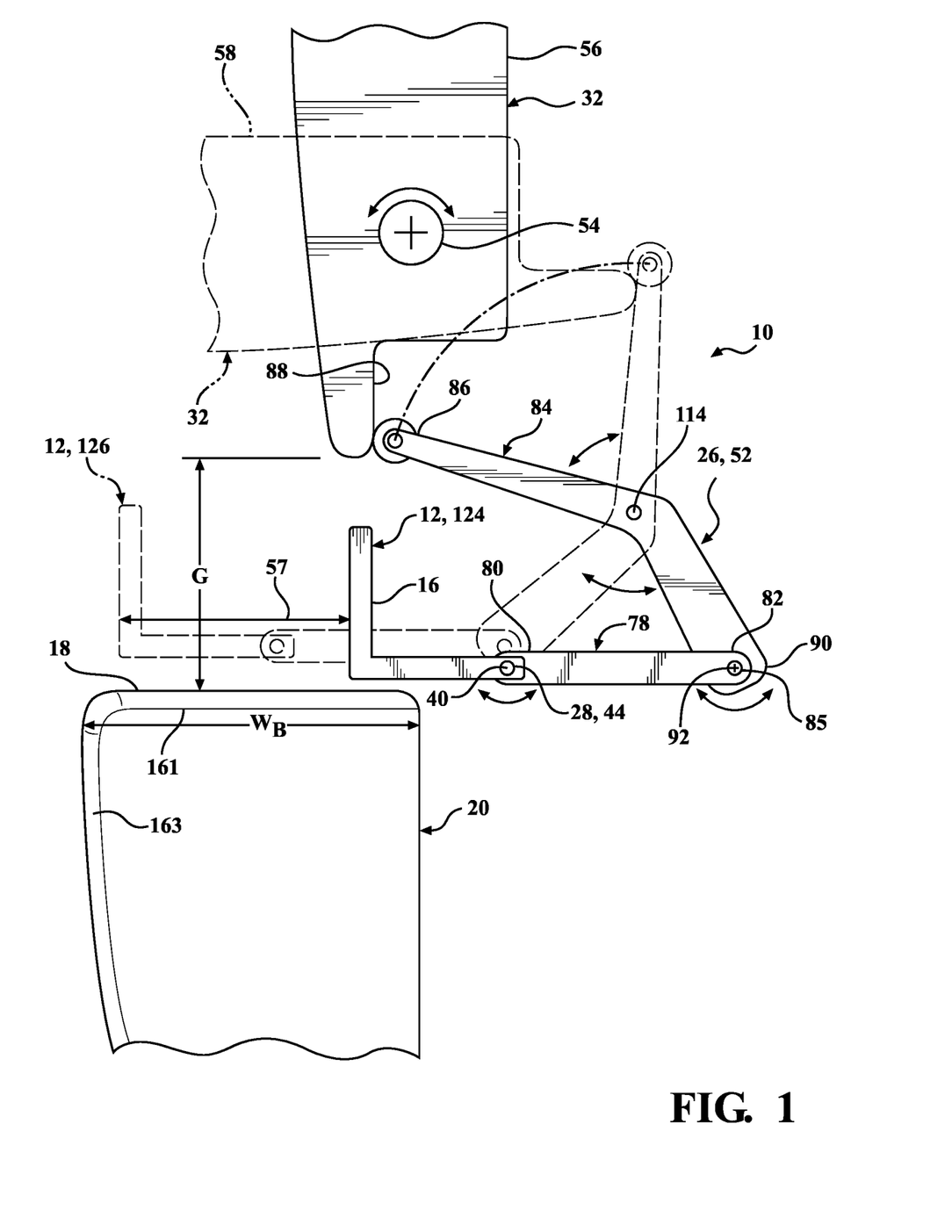
FIG. 1 is a schematic side view of an embodiment of a vehicle bumper cleaning device and an embodiment of a vehicle and a vehicle bed comprising the vehicle bumper cleaning device, as described herein.

Referring to FIGS. 1-5B, and particularly to FIGS. 1-3B, in one embodiment a vehicle bumper cleaning device 10 is disclosed. The vehicle bumper cleaning device 10 includes a selectively longitudinally movable, laterally-extending, bumper sweeper 12. The selectively longitudinally movable, laterally-extending, bumper sweeper 12 includes a first end 14 and an opposed second end 16 and is configured for disposition proximate an upper surface 18 of the vehicle bumper 20. This may include touching contact with the upper surface 18 or closely spaced apart disposition. The vehicle bumper cleaning device 10 also includes the selectively movable first actuator 22 attached by a first attachment 24 proximate the first end 14 of the bumper sweeper 12, and the selectively movable second actuator 26 attached by a second attachment 28 proximate the second end 16 of the bumper sweeper 12. The selectively movable first actuator 22 and the selectively movable second actuator 26 are configured to selectively and reversibly move the bumper sweeper 12 longitudinally rearward and forward across the vehicle bumper 20 as shown in FIG. 1. As used herein, selectively longitudinally movable with reference to the bumper sweeper 12 means reversible rearward and forward movement that is selected by a user in accordance with the design and predetermined movement characteristics of the selectively movable first actuator 22 and the selectively movable second actuator 26 to which the bumper sweeper 12 is attached. Selectively movable with reference to the selectively movable first actuator 22 and the selectively movable second actuator 26 refers to reversible pivotal or rotational movement of the actuators 22, 26 about first upper pivot axis 79 and second upper pivot 93 axis that provide a component of reversible longitudinal movement 57 that is applied or transferred to the bumper sweeper 12 by means of attachment of the bumper sweeper 12 and the actuators 22, 26 to one another. Any suitable configuration that pivotably attaches the first actuator 22 proximate the first end 14 with the first attachment 24, and the second actuator 26 proximate the second end 16 with the second attachment 28 may be employed, including pivotable attachment of the first actuator 22 directly to the first end 14 with a first attachment 24, and the second actuator 26 directly to the second end 16 with the second attachment 28, as well as the other configurations described herein. The vehicle bumper cleaning device 10 may be used with all manner of vehicles 100 that include rear vehicle beds 102 and selectively openable/closable vehicle tailgates 32 disposed therein, including vehicles 100 comprising manually openable/closable tailgates 32 and automatically openable/closable tailgates 32 as described herein.

Figures 2A, 2B:
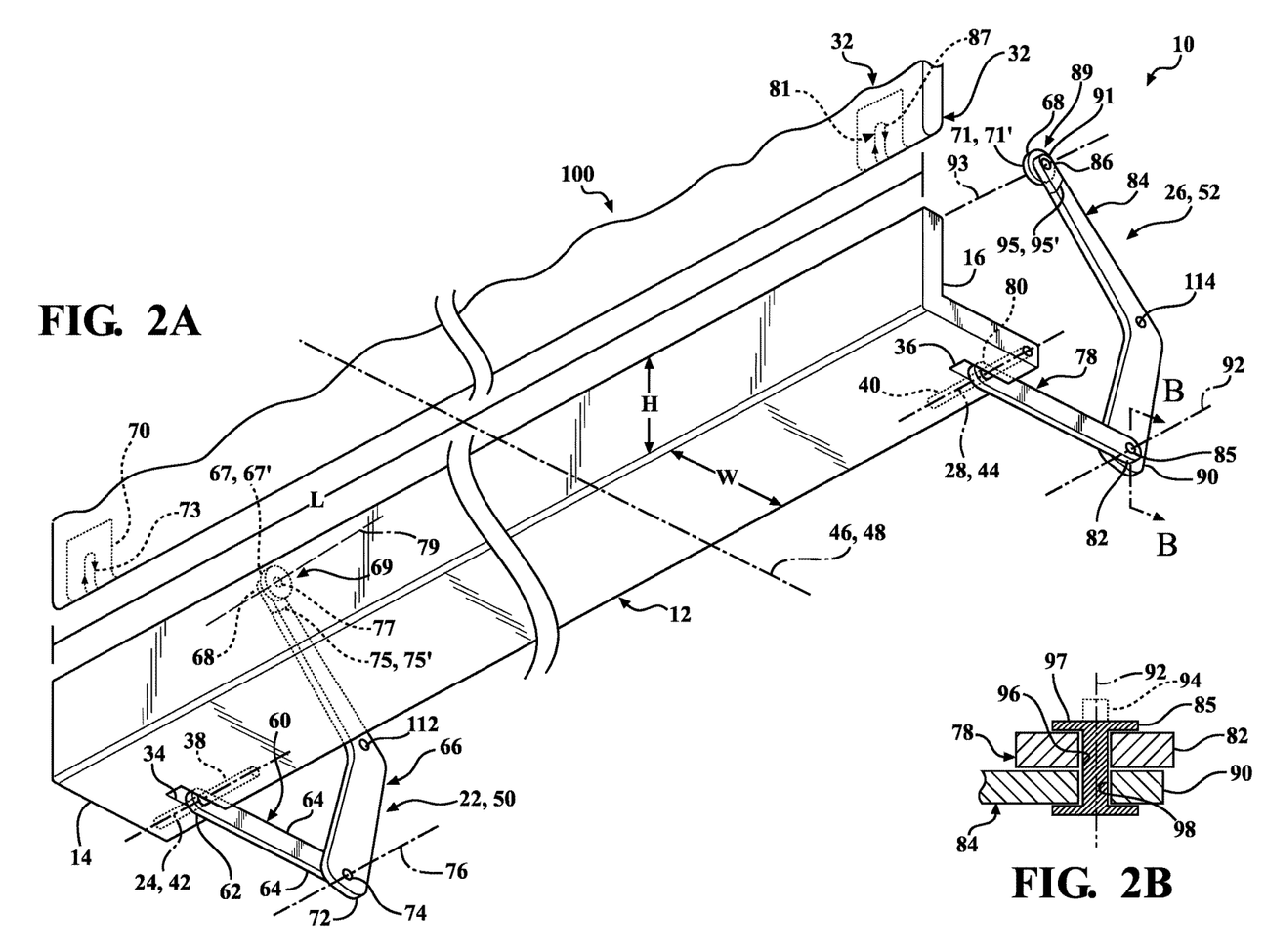
FIG. 2A is a perspective view of an embodiment of the vehicle bumper cleaning device of FIG. 1 featuring the bottom side and rear side of the surface and rear.
FIG. 2B is a cross-sectional view of FIG. 2A taken along Section B-B thereof.
Figure 5A:
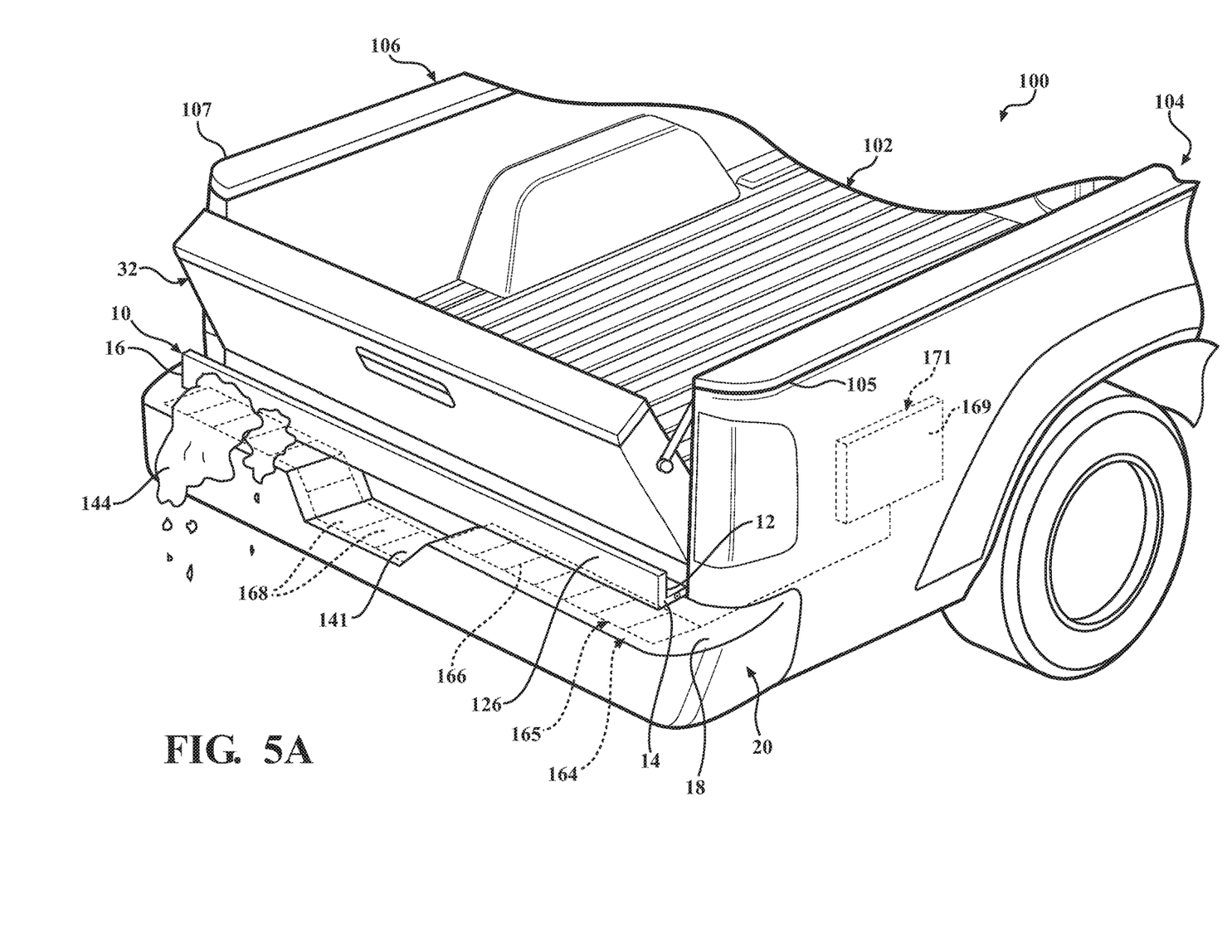
FIG. 5A is a schematic side view of another embodiment of a vehicle bumper cleaning device and an embodiment of a vehicle and a vehicle bed comprising the vehicle bumper cleaning device, the vehicle bumper comprising a bumper clearing device comprising a laterally-extending bumper heater, as described herein.

The bumper sweeper 12 may have any suitable cross-sectional shape and/or size, and in one embodiment includes an L-shape cross-section, but any suitable regular or irregular polygonal cross-sectional shape may be used, including that of a triangle, rectangle, rhombus, trapezoid, pentagon, hexagon, or the like. The bumper sweeper 12 extends laterally a length (L) which may comprise any suitable length, and in one embodiment comprises a length that extends laterally across the width of the vehicle 100, and more particularly a length (L) that extends along a laterally-extending length of the vehicle bumper 20, and even more particularly a length (L) that is greater than or equal to the lateral length of the selectively openable/closable vehicle tailgate 32, or the lateral size of the opening in the bed 102 for the vehicle tailgate 32. The bumper sweeper 12 also has a height (H) that extends in a vertical direction and a width (W) that extends in a horizontal direction and which may include any suitable height (H) and width (W). In one embodiment the height (H) is selected to be less than or equal to the size of a gap (G) between the vehicle bumper 20 and the vehicle tailgate 32. In one embodiment, the width (W) is selected to be less than or equal to the width ($W_B$) of the vehicle bumper 20, at or proximate to the upper surface 18, and in another embodiment less than or equal to one-third of the width ($W_B$) of the vehicle bumper 20, and in another embodiment less than or equal to one-fourth of the width ($W_B$) of the vehicle bumper 20. In one embodiment, the bumper sweeper 12 comprises a laterally-extending first slot 34 that is configured to receive the selectively movable first actuator 22 and first attachment 24, and a laterally-extending second slot 36 that is configured to receive the selectively movable second actuator 26 and second attachment 28 as shown in FIG. 2A. In one embodiment, the bumper sweeper 12 also comprises a cylindrical first bore 38 that extends inwardly from the first end 14 and through the first slot 34 and is configured to receive the first attachment 24, and a cylindrical second bore 40 that extends inwardly from the second end 16 and through the second slot 36 and is configured to receive the second attachment 28. The first attachment 24 and the second attachment 28 may comprise any suitable attachments that are each configured to pivotably attach the first actuator 22 and the second actuator 26 to the bumper sweeper 12, respectively. In one embodiment, the first attachment 24 and the second attachment 28 may be identical or different and may comprise a first pin or shaft 42 and a second pin or shaft 44 each configured for pressed engagement within the first bore 38 and the second bore 40, respectively. In other embodiments, the first attachment 24 and the second attachment 28 may comprise threaded bolts or press-fit bearings and the first bore 38 and the second bore 40, respectively, may be configured to receive them by the addition of suitable threads or sizing for press-fit engagement, respectively. The pivotable relationship of first attachment 24 and second attachment 28 may be provided by ensuring that they each have a diameter that is less than the diameter of the bores 38, 40 through which they pass in the first actuator 22 and the second actuator 26, respectively, for example. In an alternate embodiment, the first actuator 22 may be attached to the first end 14 directly by a pivotable joint, and the second actuator 26 may be attached to the second end 16 directly by a pivotable joint as described herein as shown in FIG. 5A. The bumper sweeper 12 may be formed from any suitable material, and in one embodiment may include a metal such as an alloy of steel or aluminum, an engineering polymer such as a fiber or filler reinforced engineering thermoplastic or thermoset polymer, a ceramic, or a composite thereof.

In one embodiment of the vehicle bumper cleaning device 10, the first actuator 22 and the second actuator 26, including their respective components, are identical to one another, and in another embodiment, the first actuator 22 and the second actuator 26, including their respective components, comprise mirror images of one another about an axis 46 (or plane) of symmetry, such as longitudinal axis 48, as illustrated in FIG. 2A.

In one embodiment of the vehicle bumper cleaning device 10, the selectively movable first actuator 22 comprises a selectively movable first linkage 50, and the selectively movable second actuator 26 comprises a selectively movable second linkage 52. The first linkage 50 and the second linkage 52 are configured for operable contact with the vehicle tailgate 32 and convert the reversible rotary motion about the tailgate hinge 54, associated with opening and closing the vehicle tailgate 32 from a closed position 56 and closed condition to an open position 58 and open condition, into a component of reversible longitudinal motion 57.

In one embodiment, the selectively movable first linkage 50 comprises a first lower link 60 comprising a first lower linkage end 62, operably attached proximate the first end 14 of the bumper sweeper 12 as described herein, and an opposed first lower link pivot end 64. The first lower link 60 may be formed from any suitable material including various metals such as alloys of steel and aluminum, engineering polymers, ceramics, or a combination or a composite thereof, and may have any suitable size and shape, including that of a straight bar with the first lower linkage end 62 and the opposed first lower link pivot end 64 being rounded.

The selectively movable first linkage 50 also comprises a first upper link 66 comprising a first upper linkage end 68, configured to operably engage the first tailgate contact surface 70, and an opposed first upper link pivot end 72. The first upper link 66 may be formed from any suitable material including various metals such as alloys of steel and aluminum, engineering polymers, ceramics, or a combination or composite thereof, and may have any suitable size and shape, including that of an angled bar (e.g., describing an obtuse angle or boomerang shape) with the first upper linkage end 68 and the opposed first upper link pivot end 72 being rounded. The first lower link pivot end 64 is pivotably attached to the first upper link pivot end 72 by a pivotable first lower linkage joint 74. The first lower linkage joint 74 may comprise any of a number of known pivotable joints that are configured to join the first lower link pivot end 64 and the first upper link pivot end 72 to one another while maintaining pivotable engagement relative to one another about a first lower pivot axis 76. The first lower linkage joint 74 may include all manner and combination of known bores and fasteners that comprise pins, shafts, bushings, bolts, nuts, retaining rings, snap rings, and bearings formed in and disposed in or on either the first lower link pivot end 64 and/or the first upper link pivot end 72 to form the pivotable joint. The first upper linkage end 68 may be configured in any manner to enable operable engagement with the first tailgate contact surface 70. In one embodiment, the first upper link 66 and the first upper linkage end 68 may be configured for biased engagement against the first tailgate contact surface 70 by the first bias member 120 (shown in FIG. 3B) so that the first upper linkage end 68 follows a first path 73 along the first tailgate contact surface 70 as the vehicle tailgate 32 moves from the closed position 56 and closed condition to the open position 58 and open condition as a tailgate contact surface follower, analogous to the motion and action of a cam follower. The first upper linkage end 68 may comprise a first friction reduction device 69. Any suitable first friction reduction device 69 may be employed on the first upper linkage end 68 to reduce the friction between it and the first tailgate contact surface 70. In one embodiment, the first friction reduction device 69 may comprise a replaceable coating layer 75 or a replaceable cap 75' disposed on the first upper linkage end 68 for this purpose and made from a low coefficient of friction material (i.e., much lower than the coefficient of friction of the material used for the first upper linkage end 68) such as various engineering polymers, including PE, PP, PTFE, or the like. In another embodiment, the first friction reduction device 69 may comprise a rotatable first wheel 67 of a low coefficient of friction material or a rotatable first bearing 67' disposed on the first upper linkage end 68 by a pivotable first upper linkage joint 77. The first upper linkage joint 77 may comprise any of a number of known pivotable joints that are configured to join the first upper linkage end 68 to the rotatable first wheel 67 or rotatable first bearing 67' to one another while maintaining pivotable engagement relative to one another about the first upper pivot axis 79 including the joint types described for first lower linkage joint 74.

The selectively movable second linkage 52 also comprises a second lower link 78 comprising a second lower linkage end 80, operably attached proximate the second end 16 of the bumper sweeper 12 as described herein, and an opposed second lower link pivot end 82. The second lower link 78 may be formed from any suitable material including various metals such as alloys of steel and aluminum, engineering polymers, ceramics, or a combination or composite thereof, and may have any suitable size and shape, including that of a straight bar with the second lower linkage end 80 and the opposed second lower link pivot end 82 being rounded.

The selectively movable second linkage 52 also comprises a second upper link 84 comprising a second upper linkage end 86, configured to operably engage the second tailgate contact surface 88, and an opposed second upper link pivot end 90. The second upper link 84 may be formed from any suitable material including various metals such as alloys of steel and aluminum, engineering polymers, ceramics, or a combination or composite thereof, and may have any suitable size and shape, including that of an angled bar (e.g., describing an obtuse angle or boomerang shape) with the second upper linkage end 86 and the opposed second upper link pivot end 90 being rounded. The second lower link pivot end 82 is pivotably attached to the second upper link pivot end 90 by a pivotable second lower linkage joint 85. The pivotable second lower linkage joint 85 may comprise any of a number of known pivotable joints that are configured to join the second lower link pivot end 82 and the second upper link pivot end 90 to one another while maintaining pivotable engagement relative to one another about a second lower pivot axis 92. The second lower linkage joint 85 may include all manner and combination of known bores and fasteners that comprise pins, shafts, bushings, bolts, nuts, retaining rings, rivets and bearings formed in and disposed in or on either the second lower link pivot end 82 and/or the second upper link pivot end 90 to form the pivotable joint. In one embodiment, for example, as shown in FIG. 2B, the pivotable second lower linkage joint 85 comprises a one headed metal pin or rivet 94 that has a diameter less than that of lower link bore 96 and upper link bore 98 and may be upset or otherwise deformed to form a second head 97, thereby attaching the second lower link 78 to the second upper link 84 while enabling them to pivot or rotate about the second lower pivot axis 92. In one embodiment the pivotable first lower linkage joint 74 may be formed in the same manner using the same or similar components and elements as the pivotable second lower linkage joint 85. The second upper linkage end 86 may be configured in any manner to enable operable engagement with the second tailgate contact surface 81. In one embodiment, the second upper link 84 and the second upper linkage end 86 may be configured for biased engagement against the second tailgate contact surface 81 by the second bias member 122 (shown in FIG. 3B) so that the second upper linkage end 86 follows a second path 87 along the second tailgate contact surface 81 as the vehicle tailgate 32 moves from the closed position 56 and closed condition to the open position 58 and open condition as a tailgate contact surface follower, analogous to the motion and action of a cam follower. The second upper linkage end 86 may comprise a second friction reduction device 89. Any suitable second friction reduction device 89 may be employed on the second upper linkage end 86 to reduce the friction between it and the second tailgate contact surface 81. In one embodiment, the second friction reduction device 89 may comprise a replaceable coating layer 95 or a replaceable cap 95' disposed on the second upper linkage end 86 for this purpose and made from a low coefficient of friction material (i.e., much lower than the coefficient of friction of the material used for the second upper linkage end 86) such as various engineering polymers, including PE, PP, PTFE, or the like. In another embodiment, the second friction reduction device 89 may comprise a rotatable second wheel 71 of a low coefficient of friction material or a rotatable second bearing 71' disposed on the second upper linkage end 86 by a pivotable second upper linkage joint 91. The second upper linkage joint 91 may comprise any of a number of known pivotable joints that are configured to join the second upper linkage end 86 to the rotatable second wheel 71 or rotatable second bearing 71' to one another while maintaining pivotable engagement relative to one another about the second upper pivot axis 93 including the joint types described for first lower linkage joint 74.

Figure 3A:
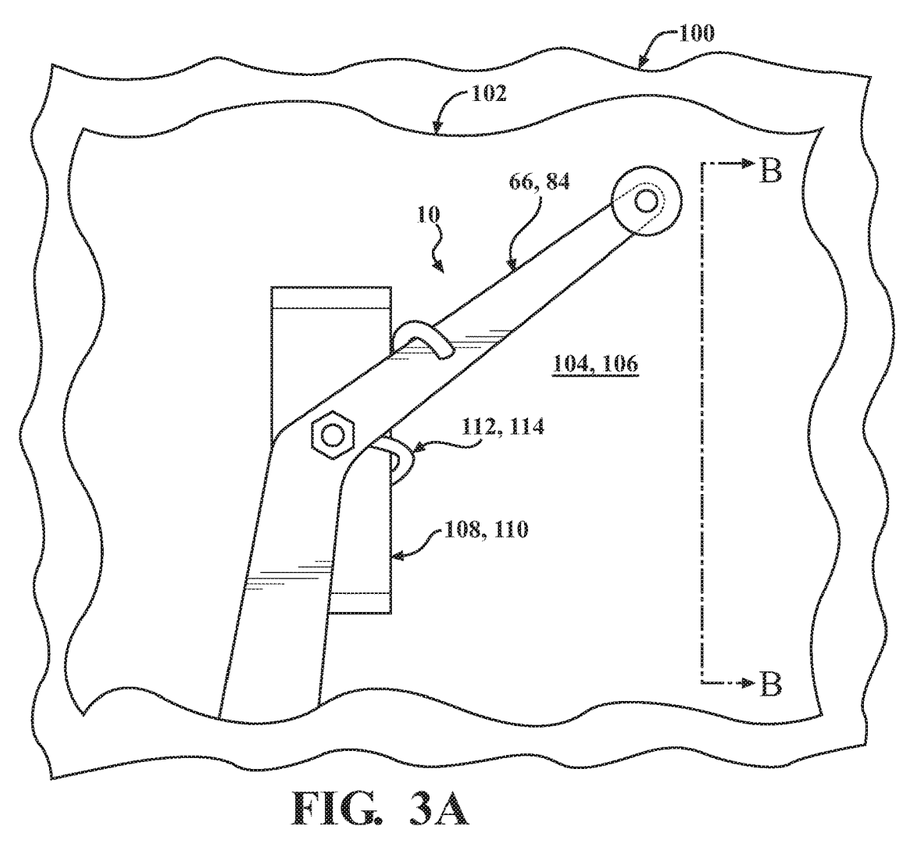
FIG. 3A is a schematic side view of an embodiment of an upper link as in FIG. 1 pivotably attached to a sidewall of a vehicle bed, as described herein.
Figure 3B:
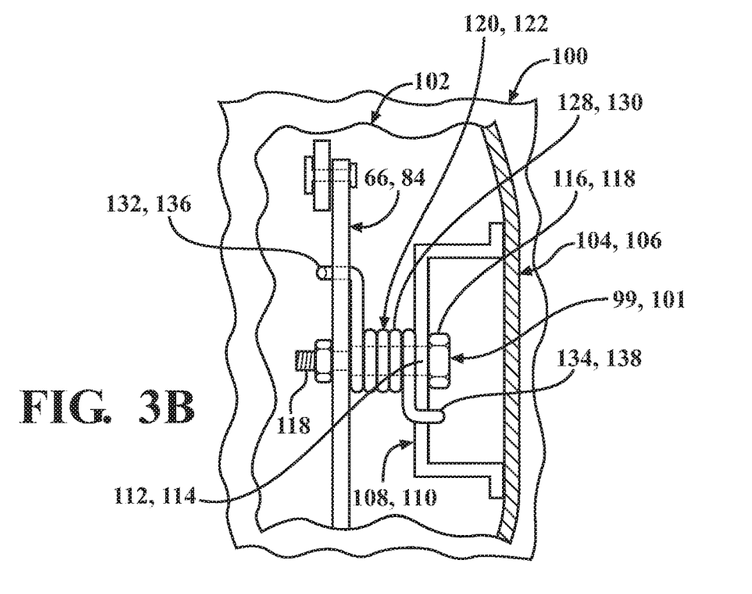
FIG. 3B is a cross-sectional view of FIG. 3A taken along Section B-B thereof.
Figure 4A:
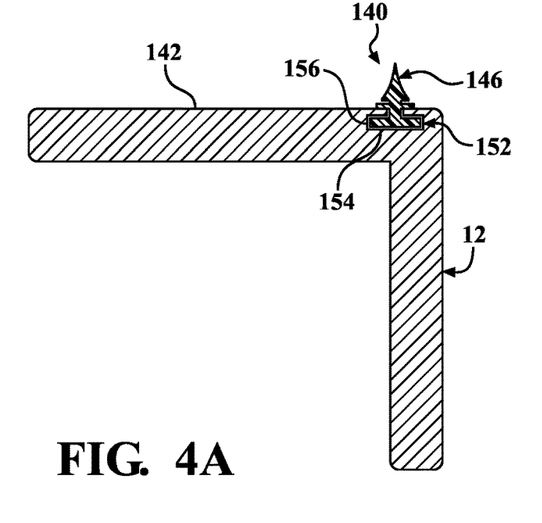
FIG. 4A is a cross-sectional view of an embodiment of a bumper sweeper comprising a bumper sweeping aid comprising a wiper disposed on a lower surface thereof.
Figure 4B:
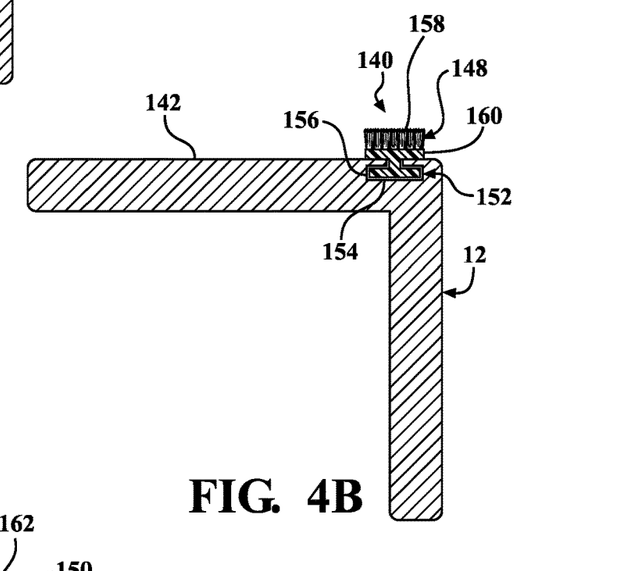
FIG. 4B is a cross-sectional view of an embodiment of a bumper sweeper comprising a bumper sweeping aid comprising a brush disposed on a lower surface thereof.
Figure 4C:
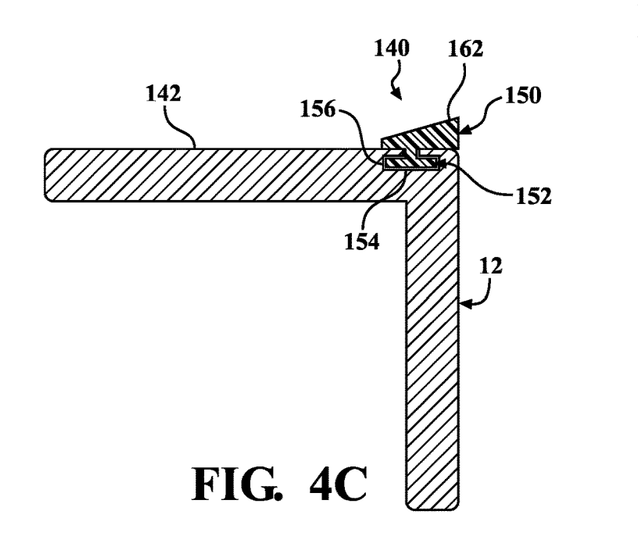
FIG. 4C is a cross-sectional view of an embodiment of a bumper sweeper comprising a bumper sweeping aid comprising a scraper disposed on a lower surface thereof.
Figure 5B:
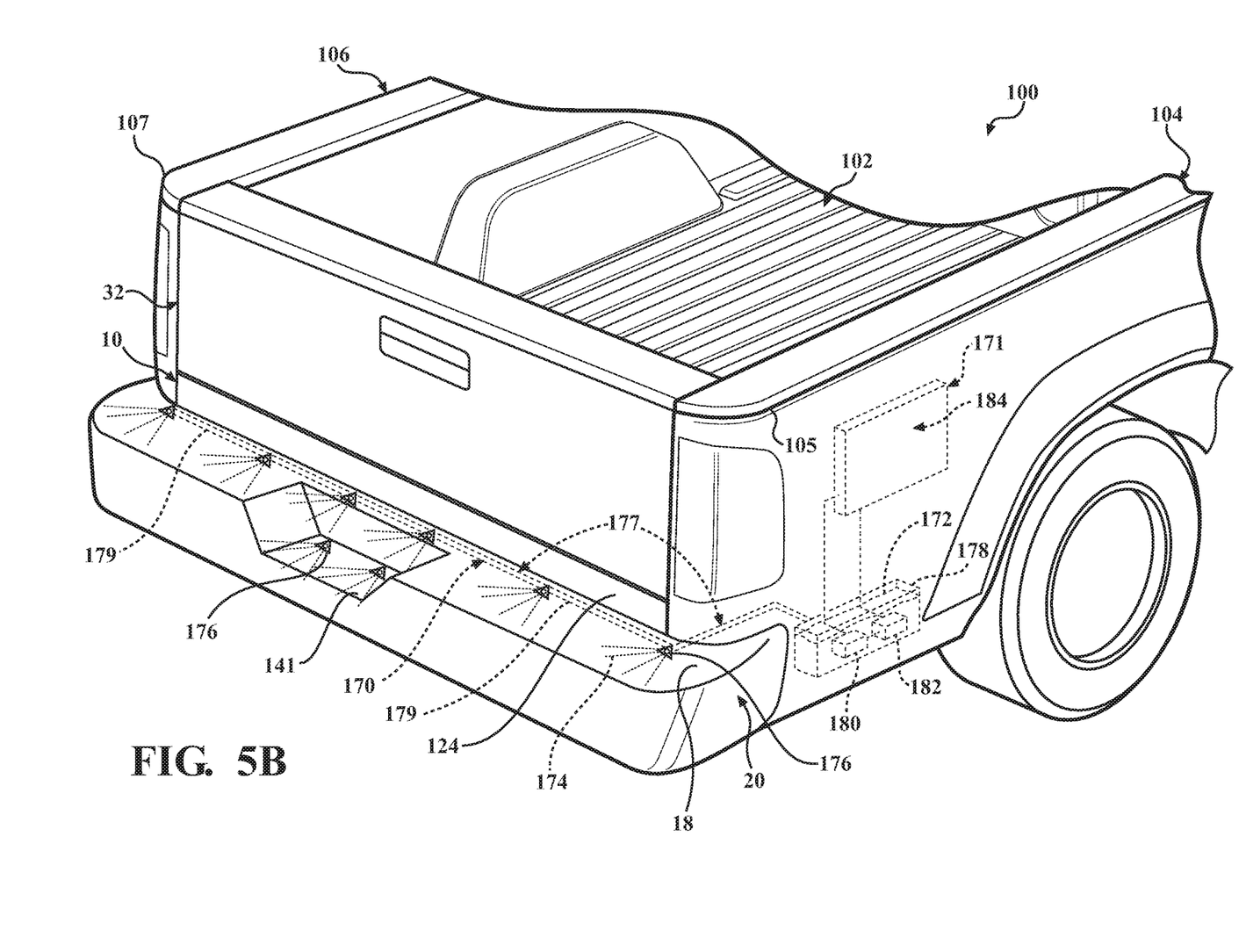
FIG. 5B is a schematic side view of yet another embodiment of a vehicle bumper cleaning device and an embodiment of a vehicle and a vehicle bed comprising the vehicle bumper cleaning device, the vehicle bumper comprising a bumper clearing device comprising a laterally-extending bumper fluid spray device, as described herein.

Referring to FIGS. 1-3B, particularly FIGS. 3A and 3B, vehicle bumper cleaning device 10, further comprises a selectively biasable first pivot 99 disposed along the first upper link 66, and a selectively biasable second pivot 101 disposed along the second upper link 84, wherein the first upper link 66 is pivotably attached at the selectively biasable first pivot 99 to the longitudinally-extending first bed sidewall 104, and the second upper link 84 is pivotably attached at the selectively biasable second pivot 101 to the longitudinally-extending second bed sidewall 106. In one embodiment, first pivot 99 and the second pivot 101 and the components to which they are attached are mirror images of one another or identical, and FIGS. 3A and 3B are used to illustrate both. As used herein, selectively biasable means configured for or capable of being biased (e.g., mechanically) to store potential energy for later use, which in this context means storing potential energy in the first actuator 22 and the second actuator 26 while opening the vehicle tailgate 32 and moving the bumper sweeper 12 to the deployed position and condition 126 (FIG. 5A) that may be released and used to return the bumper sweeper 12 to a stowed position and condition 124 as the tailgate 32 is closed (FIG. 5B).

Referring to FIGS. 1-5B, particularly FIGS. 3A and 3B and 5A and 5B, in one embodiment, vehicle bumper cleaning device 10 is disposed in and further comprises a vehicle 100 comprising a rear vehicle bed 102. The vehicle 100 may comprise any manner or type of vehicle 100 comprising a vehicle bed 102. In one embodiment, the vehicle 100 comprises an automotive vehicle, such as a car, sport utility vehicle (SUV), or truck, including all manner of light, medium, and heavy-duty pickup trucks, or another vehicle, such as an all-terrain vehicles (ATV), a utility-terrain vehicles (UTV), or another off-road vehicle. The vehicle bed 102 comprises a longitudinally-extending first bed sidewall 104 having a rearward facing first sidewall end 105, and a second bed sidewall 106 having a rearward facing second sidewall end 107. The vehicle tailgate 32 extends laterally between and is pivotably attached proximate to, and suspended by, respective rearward facing first and second sidewall ends 105, 107 as is known in the art. In one embodiment, the first and second actuators 22, 26, such as respective first and second linkages 50, 52 (see FIG. 2A), are disposed in the respective first and second bed sidewalls 104, 106, or a volume defined by the respective sidewalls 104, 106, such as by being attached within the sidewalls 104, 106. In one embodiment, the first bed sidewall 104 comprises U-shaped first mounting bracket 108 disposed proximate the first sidewall end 105. The second bed sidewall 106 comprises U-shaped second mounting bracket 110 disposed proximate the second sidewall end 107. The first and second mounting brackets 108, 110 may be attached to their respective sidewalls 104, 106 by any suitable attachments, including weld or braze joints. The first and second mounting brackets 108, 110 include respective first and second bracket bores 112, 114 in the bases of the U-shapes that are configured to pivotably receive the selectively insertable/removable first and second link mounting fasteners 116, 118. The first and the second link mounting fasteners 116, 118 may include any suitable fasteners capable of being selectively inserted/removed from the respective first and second bracket bores 112, 114 and of pivotably attaching the respective first upper link 66 to the first mounting bracket 108, and the second upper link 84 to the second mounting bracket 110. In one embodiment, first and second link mounting fasteners 116, 118 comprise threaded bolts and nuts configured to selectively attach/detach the selectively movable first actuator 22 (e.g., selectively movable first linkage 50) and the selectively movable second actuator 26 (e.g., selectively movable second linkage 52). In one embodiment, the first actuator 22 comprises and is in operable engagement with a first bias member 120, and the second actuator 26 comprises and is in operable engagement with a second bias member 122. The first and the second bias members 120, 122 are configured to be biased by contact with the vehicle tailgate 32 at respective first and second tailgate contact surfaces 70, 81. (See FIG. 2A.) The biasing occurs while opening the vehicle tailgate 32 from the closed position 56 and condition to the open position 58 and condition and moving the vehicle bumper cleaning device 10 longitudinally from the stowed position and condition 124 (FIGS. 1 and 5B) to the deployed position and condition 126 (FIGS. 1 and 5A). Thus biased to store energy, the first and the second bias members 120, 122 are configured to apply a return force to the respective first and second actuators 22, 26 to return the vehicle bumper cleaning device 10 and the bumper sweeper 12 from the deployed position and condition 126 to the stowed position and condition 124. In one embodiment, the first bias member 120 comprises the first coil spring member 128 disposed over the first link mounting fastener 116, and the second bias member 122 comprises the second coil spring member 130 disposed over the second link mounting fastener 118. The first coil spring member 128 comprises a first link arm 132, that is configured to engage the first upper link 66, and a first bracket arm 134 that is configured to engage the first mounting bracket 108 and thereby allow the coils of the first coil spring member 128 to be wound (or unwound) as a torsion spring to store potential energy as the first link arm 132 pivots or rotates while the vehicle tailgate 32 is being opened. Similarly, second coil spring member 130 comprises second link arm 136, that is configured to engage the second upper link 84, and a second bracket arm 138 that is configured to engage the second mounting bracket 110 and thereby allow the coils of the second coil spring member 130 to be wound (or unwound) to store potential energy as the second link arm pivots 136 or rotates while the vehicle tailgate 32 is being opened.

Referring to FIGS. 1-5B, particularly FIGS. 4A-4C and FIGS. 5A and 5B, in one embodiment, the vehicle bumper cleaning device 10 further comprises a laterally-extending bumper sweeping aid 140 disposed on a lower surface 142 of the bumper sweeper 12. The bumper sweeping aid 140 may comprise any suitable device or mechanism that is configured to aid in the engagement of the bumper sweeper 12 with the upper surface 18 of the vehicle bumper 20 as it moves from the stowed position or condition 124 to the deployed position or condition 126, particularly a device or mechanism that is configured to engage accumulated material 144, as described herein, that is disposed on the upper surface 18 of the bumper 20 and is configured to apply forces designed to facilitate the release of the accumulated material 144 from the upper surface 18 and also is configured to sweep the released accumulated material 144 across the upper surface toward a rearward edge of the bumper 20 for removal by gravity and/or forces associated with vehicle movement, or a combination thereof. In one embodiment, the bumper sweeping aid 140 comprises a wiper blade 146 (FIG. 4A), brush 148 (FIG. 4B), scraper 150 (FIG. 4C), or a combination thereof, and is configured for touching contact with or spaced disposition from the upper surface 18 of vehicle bumper 20. The bumper sweeping aid 140 may have any suitable length, and in one embodiment may have the same length (L) as the bumper sweeper 12. The laterally-extending bumper sweeping aid 140 may be attached to the lower surface 142 of the bumper sweeper 12 by any suitable attachment 152. In one embodiment, the attachment 152 comprises an attachment portion 154 of the bumper sweeping aid 140, such as a laterally-extending dovetail or tongue-and-groove portion, that is configured for selectively attachable/detachable engagement into a channel or groove or slot 156 formed in the lower surface 142 of the bumper sweeper 12 that is configured to securely attach and retain the bumper sweeping aid 140. The laterally-extending bumper sweeping aid 140 may comprise one laterally-extending piece or a plurality of laterally-extending pieces that may be in touching contact with one another or spaced apart. In one example, the laterally-extending bumper sweeping aid 140 may comprise two pieces that extend inwardly from the first end 14 and the second end 16 of the bumper sweeper 12, which, in one embodiment, meet in the center, and which, in another embodiment, are spaced apart and do not extend over the license plate recess 141.

In one embodiment, the laterally-extending bumper sweeping aid 140 may comprises a wiper blade 146 (FIG. 4A) comprising an elastomeric polymer wiper material, which may include any suitable elastomeric polymer, such as natural and synthetic rubber materials. In one embodiment, wiper blade 146 comprises elastomeric polymer wiper materials and wiper construction components that are the same as or similar to conventional windshield wipers.

In one embodiment, the laterally-extending bumper sweeping aid 140 may comprise a brush 148 (FIG. 4B) comprising a plurality of vertically-extending bristles 158 embedded in a bristle base 160. The bristles 158 and bristle base 160 may comprise any suitable material, which may be the same or different materials, and which in one embodiment may comprise an engineering thermoplastic or thermoset polymer or polymers.

In one embodiment, the laterally-extending bumper sweeping aid 140 may comprise a scraper 150 (FIG. 4C) comprising a rearward-facing, laterally-extending, scraping edge 162. The scraper 150 may comprise any suitable material, which in one embodiment may comprise an engineering thermoplastic or thermoset polymer or polymers.

Referring to FIGS. 1-5B, particularly FIG. 5A, in one embodiment of the vehicle bumper cleaning device 10 the vehicle bumper 20 further comprises a laterally-extending bumper heater system 164 that comprises a laterally-extending bumper heating element 165 that is configured to heat the upper surface 18 of the vehicle bumper 20. The bumper heating element 165 may be disposed on the upper surface 18 of the vehicle bumper 20, or disposed within the vehicle bumper 20, such as by being molded into a component of the vehicle bumper 20 such as the bumper cover 163, or may be disposed under the structure that forms the upper surface 18 of the vehicle bumper 20, such as the lower surface 161 of the bumper cover 163. The bumper heating element 165 may comprise any suitable heater material, which in one embodiment comprises a material with a resistivity suitable for forming a resistive heating element. In one embodiment, the bumper heating element 165 and heater material may be the same as or similar to the heater materials used to form various automobile front and rear windshield defrosting elements and/or exterior mirror defrosting elements, such as patterns formed from various thick film resistive pastes that are printed onto and then cured and bonded onto the windshields and/or exterior mirrors as a substrate. The configuration of the bumper heating element 165 may have any suitable configuration of the heating element, such as various laterally-extending serpentine configurations (not shown) or a plurality of spaced apart, longitudinally-extending bridge members 166 that extend between two or more, spaced apart, laterally-extending, base members 168. In one embodiment, the heater 164 may be operated by a heater controller 169, such as a vehicle control module 171, and may be operated and controlled in a manner analogous to or in conjunction with the vehicle defrost heater system used in conjunction with the front and rear windshields and/or exterior mirrors.

Referring to FIGS. 1-5B, particularly FIG. 5B, in one embodiment of the vehicle bumper cleaning device 10 the vehicle bumper 20 further comprises a laterally-extending fluid dispensing system 170 that is configured to dispense the fluid 172 in a fluid pattern 174, such as a fluid spray pattern, across and onto an upper surface 18 of the vehicle bumper 20. In one embodiment, the fluid dispensing system 170 comprises a plurality of laterally-extending, spaced apart, fluid nozzles 176 that are interconnected by a fluid conduit 177, which in one embodiment may comprise a plurality of conduit sections 179 that extend between and interconnect fluid nozzles 176 configured to dispense the pressurized fluid 172 received from the fluid dispenser 178 by the operation of a fluid pump 180. The fluid 172 may also be heated by a fluid heater 182. The operation of the fluid dispensing system 170, including the operation of the fluid pump 180 and the fluid heater 182, may be controlled by a fluid system controller 184, such as a vehicle control module 171, and may be operated and controlled in a manner analogous to or in conjunction with the vehicle windshield washer system, including the front and/or rear window washer system. The fluid 172 may be any suitable fluid configured to melt or dissolve or otherwise interact with the accumulated material 144 to weaken its attachment to, or detached it from, the upper surface 18 of the vehicle bumper 20. In one embodiment, the fluid 172 comprises water or an aqueous solution, which in one embodiment may comprise a windshield washer solvent. In one embodiment, the fluid 172 comprises a gas, such as air, which may also be controlled, including being pressurized and heated, in a manner analogous to or in conjunction with the vehicle HVAC system.

Figure 6:
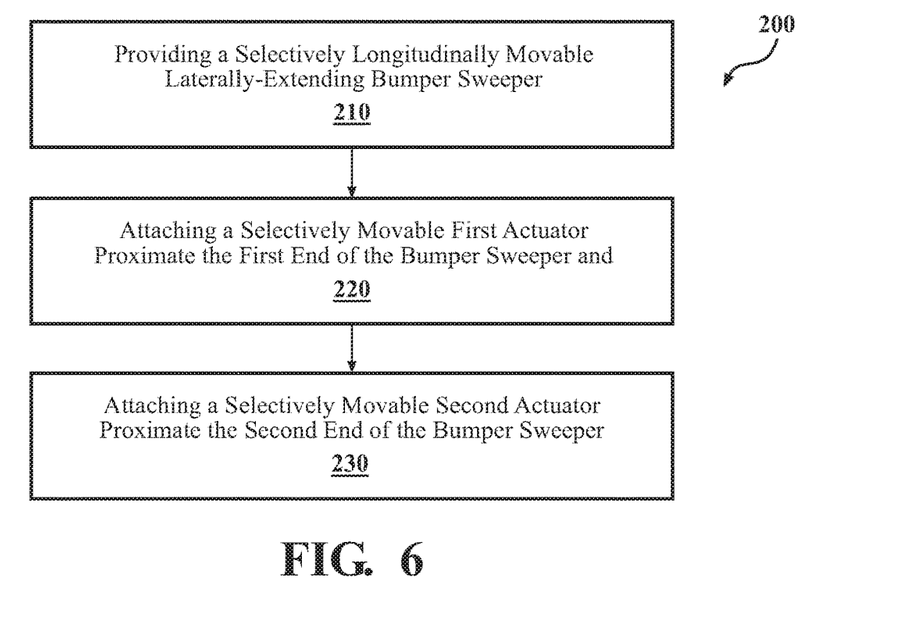
FIG. 6 is a flowchart of an embodiment of a method of making a vehicle bumper cleaning device.

Referring to FIG. 6, in one embodiment, a method of making 200 a vehicle bumper cleaning device 10 is disclosed. The method of making 200 comprises providing 210 a selectively longitudinally movable, laterally-extending, bumper sweeper 12 comprising a first end 14 and an opposed second end 16 and configured for disposition proximate an upper surface 18 of the vehicle bumper 20. The method of making 200 also comprises attaching 220 a selectively movable first actuator 22 proximate the first end 14 of the bumper sweeper 12; and attaching 230 a selectively movable second actuator 26 proximate the second end 16 of the bumper sweeper 12, the selectively movable first actuator 22 and the selectively movable second actuator 26 configured to selectively and reversibly move the bumper sweeper 12 rearward and forward across the vehicle bumper 20.

Figure 7:
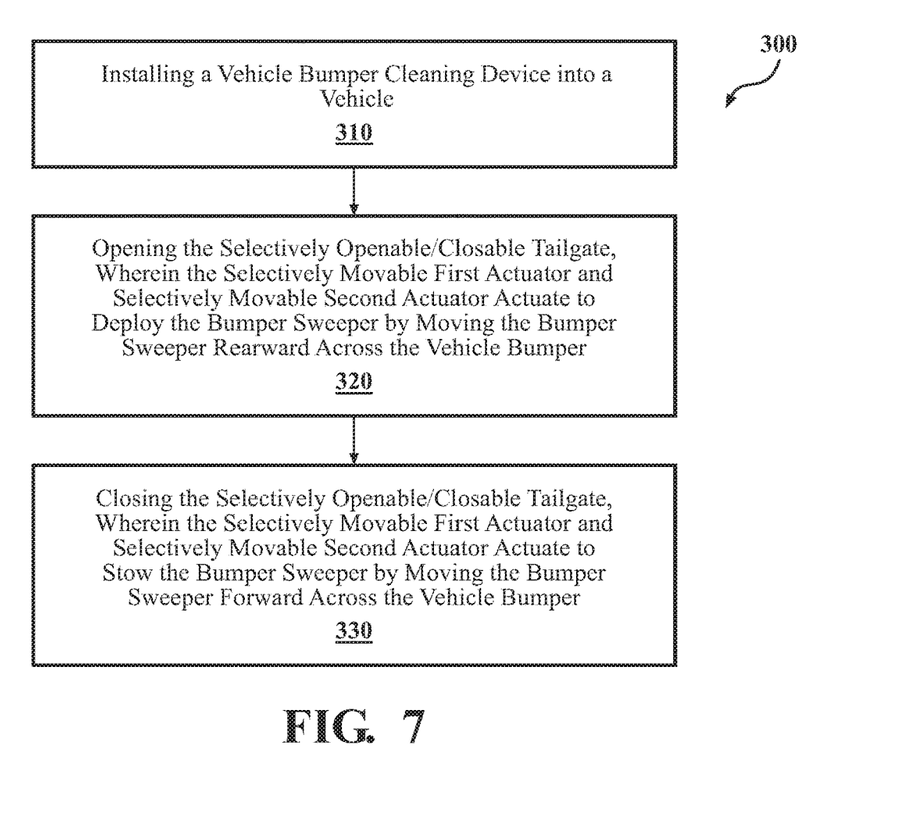
FIG. 7 is a flowchart of an embodiment of a method of using a vehicle bumper cleaning device.

Referring to FIG. 7, in one embodiment, a method of using 300 a vehicle bumper cleaning device 10 is disclosed. The method of using 300 comprises installing 310 a vehicle bumper cleaning device 10 into a vehicle 100 comprising a vehicle bed 102, a selectively openable/closable tailgate 32 pivotably attached to the rear bed 102, and a vehicle bumper 20 disposed under and rearward of the tailgate 32. The vehicle bumper cleaning device 10 comprises a selectively longitudinally movable, laterally-extending, bumper sweeper 12 comprising a first end 14 and an opposed second end 16 and configured for disposition proximate an upper surface 18 of the vehicle bumper 20; a selectively movable first actuator 22 attached proximate the first end 14 of the bumper sweeper 12; and a selectively movable second actuator 26 attached proximate the second end 16 of the bumper sweeper 12, the selectively movable first actuator 22 and the selectively movable second actuator 26 configured to selectively and reversibly move the bumper sweeper 12 rearward and forward across the vehicle bumper 20.

The method of using 300 also comprises opening 320 the selectively openable/closable tailgate 32, wherein the selectively movable first actuator 22 and selectively movable second actuator 26 actuate to deploy the bumper sweeper 12 by moving the bumper sweeper 12 rearward across the vehicle bumper 20 to a deployed position and condition 126.

The method of using 300 also comprises closing 330 the selectively openable/closable tailgate 32, wherein the selectively movable first actuator 22 and selectively movable second actuator 26 actuate to stow the bumper sweeper 12 by moving the bumper sweeper 12 forward across the vehicle bumper 20 to a stowed position and condition 124.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of items is applied to all of the listed items, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the components or elements described herein specifically discloses and includes the embodiments that "consist essentially of" the named components (i.e., contain the named components and no other components that significantly adversely affect the basic and novel features disclosed), and embodiments that "consist of" the named components (i.e., contain only the named components).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A vehicle bumper cleaning device, comprising:
    a selectively longitudinally movable, laterally-extending, bumper sweeper comprising a first end and an opposed second end and configured for disposition proximate an upper surface of a vehicle bumper;
    a selectively movable first actuator attached proximate the first end of the bumper sweeper; and
    a selectively movable second actuator attached proximate the second end of the bumper sweeper, the selectively movable first actuator and the selectively movable second actuator configured to selectively and reversibly move the bumper sweeper rearward and forward across the vehicle bumper.

2. The vehicle bumper cleaning device of claim 1, wherein the selectively movable first actuator and the selectively movable second actuator are identical to one another or comprise mirror images of one another.

3. The vehicle bumper cleaning device of claim 1, wherein the selectively movable first actuator comprises a selectively movable first linkage and the selectively movable second actuator comprises a selectively movable second linkage.

4. The vehicle bumper cleaning device of claim 3, wherein the selectively movable first linkage comprises a first lower link comprising a first lower linkage end operably attached proximate the first end of the bumper sweeper and an opposed first lower link pivot end, and a first upper link comprising a first upper linkage end configured to operably engage a first tailgate contact surface and an opposed first upper link pivot end, the first lower link pivot end pivotably attached to the first upper link pivot end, and the selectively movable second linkage comprises a second lower link comprising a second lower linkage end operably attached proximate the second end of the bumper sweeper and an opposed second lower link pivot end, and a second upper link comprising a second upper linkage end configured to operably engage an opposed second tailgate contact surface and an opposed second upper link pivot end, the second lower link pivot end pivotably attached to the second upper link pivot end.

5. The vehicle bumper cleaning device of claim 4, further comprising a vehicle comprising a rear bed comprising a longitudinally-extending first bed sidewall having a rearward facing first sidewall end, an opposed longitudinally-extending second bed sidewall comprising a rearward facing second sidewall end, and a selectively openable/closable tailgate pivotably attached by a first pivot to the first sidewall end and pivotably attached by a second pivot to the second sidewall end, and further comprising a first pivot point disposed along the first upper link and a second pivot point disposed along the second upper link, wherein the first upper link is pivotably attached at the first pivot point to the first bed sidewall and the second upper link is pivotably attached at the second pivot point to the second bed sidewall.

6. The vehicle bumper cleaning device of claim 1, further comprising a laterally-extending bumper sweeping aid disposed on a lower surface of the bumper sweeper.

7. The vehicle bumper cleaning device of claim 6, wherein the bumper sweeping aid comprises a scraper, brush, wiper blade, or a combination thereof, and is configured for touching contact with or spaced disposition from the vehicle bumper.

8. The vehicle bumper cleaning device of claim 1, wherein the vehicle bumper further comprises a laterally-extending bumper heater system that is configured to heat the upper surface of the vehicle bumper or a laterally-extending fluid dispensing system that is configured to dispense a fluid in a fluid pattern on the upper surface of the vehicle bumper.

9. A method of making a vehicle bumper cleaning device, comprising:
    providing a selectively longitudinally movable, laterally-extending, bumper sweeper comprising a first end and an opposed second end and configured for disposition proximate an upper surface of a vehicle bumper;
    attaching a selectively movable first actuator proximate the first end of the bumper sweeper; and
    attaching a selectively movable second actuator proximate the second end of the bumper sweeper, the selectively movable first actuator and the selectively movable second actuator configured to selectively and reversibly move the bumper sweeper rearward and forward across the vehicle bumper.

10. A method of using a vehicle bumper cleaning device, comprising:
    installing a vehicle bumper cleaning device into a vehicle comprising a rear bed, a selectively openable/closable tailgate pivotably attached to the rear bed, and a rear bumper disposed under and rearward of the selectively openable/closable tailgate, the vehicle bumper cleaning device comprising a selectively longitudinally movable, laterally-extending, bumper sweeper comprising a first end and an opposed second end and configured for disposition proximate an upper surface of the vehicle bumper; a selectively movable first actuator attached proximate the first end of the bumper sweeper; and a selectively movable second actuator attached proximate the second end of the bumper sweeper, the selectively movable first actuator and the selectively movable second actuator configured to selectively and reversibly move the bumper sweeper rearward and forward across the vehicle bumper;

opening the selectively openable/closable tailgate, wherein the selectively movable first actuator and the selectively movable second actuator actuate to move the bumper sweeper rearward across the vehicle bumper; and closing the selectively openable/closable tailgate, wherein the selectively movable first actuator and the selectively movable second actuator actuate to move the bumper sweeper forward across the vehicle bumper.

* * * * *